US012265820B2

(12) United States Patent
Yong et al.

(10) Patent No.: US 12,265,820 B2
(45) Date of Patent: Apr. 1, 2025

(54) METHOD AND APPARATUS FOR UPGRADING A CAMERA

(71) Applicant: MOTOROLA SOLUTIONS, INC., Chicago, IL (US)

(72) Inventors: Jia Wen Yong, Bayan Lepas (MY); Chun Meng Tan, Bayan Lepas (MY); Sook Lee Koid, Butterworth (MY); Chee Seng Lee, Jelutong (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 255 days.

(21) Appl. No.: 18/297,672

(22) Filed: Apr. 10, 2023

(65) Prior Publication Data
US 2024/0338205 A1   Oct. 10, 2024

(51) Int. Cl.
*G06F 8/654*     (2018.01)
*G06F 8/61*      (2018.01)

(52) U.S. Cl.
CPC ............... *G06F 8/654* (2018.02); *G06F 8/61* (2013.01)

(58) Field of Classification Search
None
See application file for complete search history.

(56) References Cited

U.S. PATENT DOCUMENTS

| 9,607,501 | B2 * | 3/2017 | English | H04N 23/90 |
| 11,354,994 | B1 * | 6/2022 | Staudacher | G08B 13/196 |
| 2019/0289194 | A1 * | 9/2019 | Cha | H04N 23/90 |
| 2024/0338205 | A1 * | 10/2024 | Yong | G06F 8/65 |

FOREIGN PATENT DOCUMENTS

JP    2017028408 A   *  2/2017

OTHER PUBLICATIONS

Remagnino, "Distributed intelligence for multi-camera visual surveillance", 2003, www.ElsevierComputerScience.com (Year: 2003).*

* cited by examiner

*Primary Examiner* — Hossain M Morshed

(57) ABSTRACT

A method and apparatus for minimizing a time that a camera field of view is not being monitored while the camera is undergoing a software or firmware update is provided herein. During operation a determination is made that a camera needs a software or firmware update. The location of a security asset (e.g., a mobile camera, a security guard, a drone, . . . , etc.) is determined. The update is performed based on the security asset being within a predetermined distance from the camera. More particularly, in one embodiment, the update is performed only when the security asset is within the predetermined distance from the camera.

15 Claims, 3 Drawing Sheets

METHOD AND APPARATUS FOR UPGRADING A CAMERA

BACKGROUND

When software or firmware of a security camera is being updated, the camera is typically offline and not able to stream video. Because of this, security personnel will not be able to know what happens within the camera's field of view as the update takes place. It would be beneficial if any camera update minimizes a time that the camera's field of view is not monitored.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
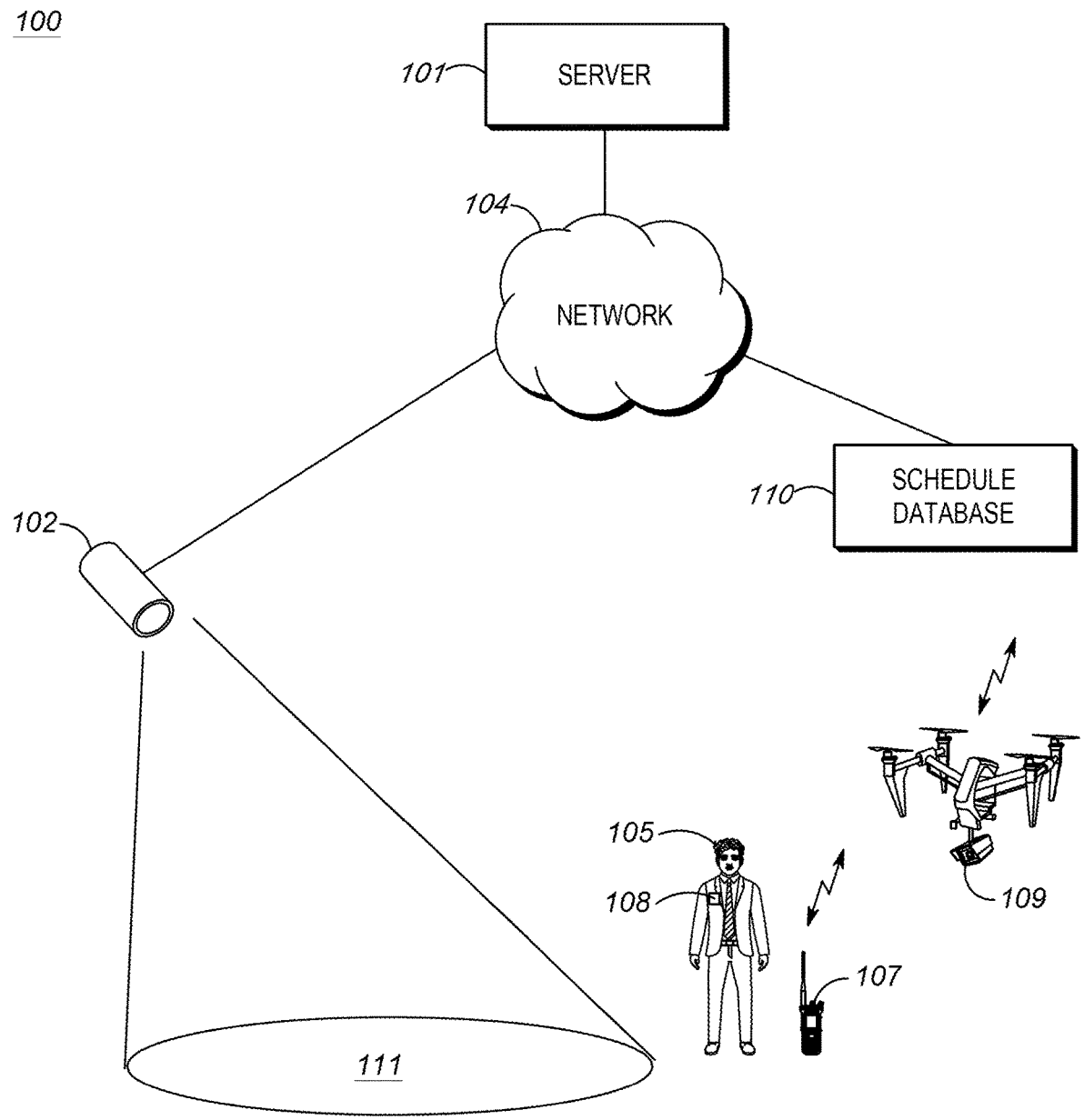
FIG. 1 illustrates an operational environment for the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In order to minimize a time that a camera's field of view is not monitored, a method and apparatus for performing a software or firmware update of the camera is provided herein. During operation a determination is made that a camera needs a software or firmware update. The location of a security asset (e.g., a mobile camera, a security guard, a drone, ..., etc.) is determined along with a location of the camera that needs updating. The update is performed based on the security asset being within a predetermined distance from the camera.

Consider the following example: A security guard routinely patrols an area where a stationary camera exists. If the stationary camera is in need of an update, the update may be delayed until the security guard is within a predetermined distance to the stationary camera. It should be noted that if it is desired to have a field-of-view (FOV) of the stationary camera recorded at all times, the update may be delayed until a mobile camera is within the predetermined distance to the stationary camera. Mobile cameras may include a body-worn camera worn by a security guard, a drone equipped with a camera, or any other type of camera that can be physically moved.

In a further embodiment of the present invention, a schedule for the security asset (e.g., a schedule for a security guard or mobile camera) may be determined. From this schedule, it may be possible to determine the movements of the security asset. The stationary camera may have its update delayed until the security asset is scheduled to be within a predetermined distance to the stationary camera. For example, consider a stationary camera that covers a point of egress for a building. The point of egress may have a security guard present within working hours. In this case, if a security guard is scheduled to be present at the point of egress between 9 AM and 5 PM, the stationary camera may have the update delayed until that time.

In a further embodiment of the present invention, a camera may delay any update if the security asset is tasked to perform other higher priority tasks than patrolling. For example, the security guard is tasked to escort a targeted person and passes the camera's field of view. From the scheduled database, the camera would retrieve the current task of the security guard and refrain from executing the updates.

In yet a further embodiment of the present invention, a camera may delay any update until the security asset is detected within the camera's FOV. So, for example, if a camera detects a particular person (e.g., officer Fred), or a particular object (e.g., a drone or mobile camera), the camera can be instructed to update its firmware or software.

In yet a further embodiment of the present invention, a camera may delay any update until the security asset is detected within the camera's FOV and is monitoring the environment. For example, if a security guard passes by and is interacting with a hand-held device, the camera would know the security guard is not monitoring the environment and thus refrain from executing the updates.

In yet a further embodiment of the present invention, a camera may delay any update until the security asset is detected within the camera's FOV and is predicted to stay through the update process. For example, a typical camera update process needs 10 seconds. A security guard is walking into the camera FOV with a normal speed. A prediction may be made that the security guard will remain within the predetermined distance from the camera for the update process.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions (code). These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes may be referred to herein as "blocks" rather than "steps." The two words are interchangeable.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, FIG. 1 illustrates a general operating environment 100 of the present invention. As shown, environment 1004 is equipped with multiple cameras 102 positioned to capture individuals and objects as they roam through the camera's FOV 111. It should be noted that only one camera 102 is shown in FIG. 1 although in reality, many cameras 102 may be present, each covering a particular field of view (FOV). Thus, each camera 102 has a spatial area that the camera can view, referred to as its FOV. The FOV is based on the geographical location of the camera, mounting height, and pan-tilt-zoom capabilities of the camera while also accounting for physical obstructions of the field of view.

Update server 101 is provided. Server 101 is configured to determine if an update is to be pushed to camera 102. More particularly, server 101 is configured to cause camera 102 to be updated based on a security asset being within a predetermined distance (e.g., 10 meters) from camera 102, or within the camera's FOV. When an update is needed, and the security asset is within the predetermined distance, server 101 will push the update to the camera, causing the camera to update its firmware or software. Security assets comprise any number of non-stationary assets, such as, but not limited to a particular person 105 such as a security guard, a mobile camera, a body-worn camera 108, and a drone equipped with a camera 109.

Camera's 102, 108, and 109 are attached (i.e., connected) to server 101 through network 104. Example networks include any combination of wired and wireless networks, such as Ethernet, T1, Fiber, USB, IEEE 802.11, 3GPP LTE, and the like. During operation, server 101 may receive location information from camera 108, drone 109, and/or camera 102. As discussed above, stationary camera 102 will have any update to its software or firmware delayed until a security asset 105, 108, or 109 is within a predetermined distance from camera 102.

Update server 101 may be a separate device or may lie internal to other network equipment. In addition, although not specifically described herein, one of ordinary skill in the art will recognize that the logic embodied within server 101 can be pushed to each camera 102 in an alternate embodiment. Server 101 is configured to maintain a database of updates associated with each camera 102, and whether or not a particular camera needs an update. When a camera needs an update, update server is configured to push the update to the camera when a security asset is within a predetermined distance (e.g., 10 meters) from the camera, or within the camera's FOV, causing the camera to update.

Smart device 107 is provided. Smart device 107 preferably comprises a handheld radio or smart phone that is capable of providing location information to server 101. During patrol, security guard 105 will carry smart device 107. Thus, smart device 107 may be used as a proxy for the location of security guard 105. It should be noted that while smart device 107 preferably comprises a radio or smart phone, in alternate embodiments, smart device 107 may comprise any device that is capable of being carried by guard 105 and also providing server 101 with its location. It should also be noted that in the preferred embodiment of the present invention, cameras 108, 102, and drone 109 are equipped with GPS receivers capable of determining a precise geographic location and providing this information to server 101. Alternatively, since camera 102 is stationary, the location of camera 102 may simply be identified and stored in an internal database within server 101.

In an alternate embodiment of the present invention schedule database 110 is provided. Database 110 comprises memory that may include one or more of static or dynamic storage, or removable or non-removable storage, for example. Database 110 may include any machine-readable medium that is capable of storing, encoding, or carrying schedule data that is accessible by server 101, such as solid-state memories, magnetic media, and optical media. Machine-readable medium may include, for example, Electrically Programmable Read-Only Memory (EPROM), Random Access Memory (RAM), or flash memory.

As discussed, schedule database 110 comprises a schedule of security assets. This schedule may comprise a particular time when the security asset is to be within a particular location. For example, database 110 may comprise a schedule for security guard 105 or drone 109 so that server 101 may get information on when or if security guard 105 or drone 109 is to be within a predetermined distance from camera 102.

Figure 2:
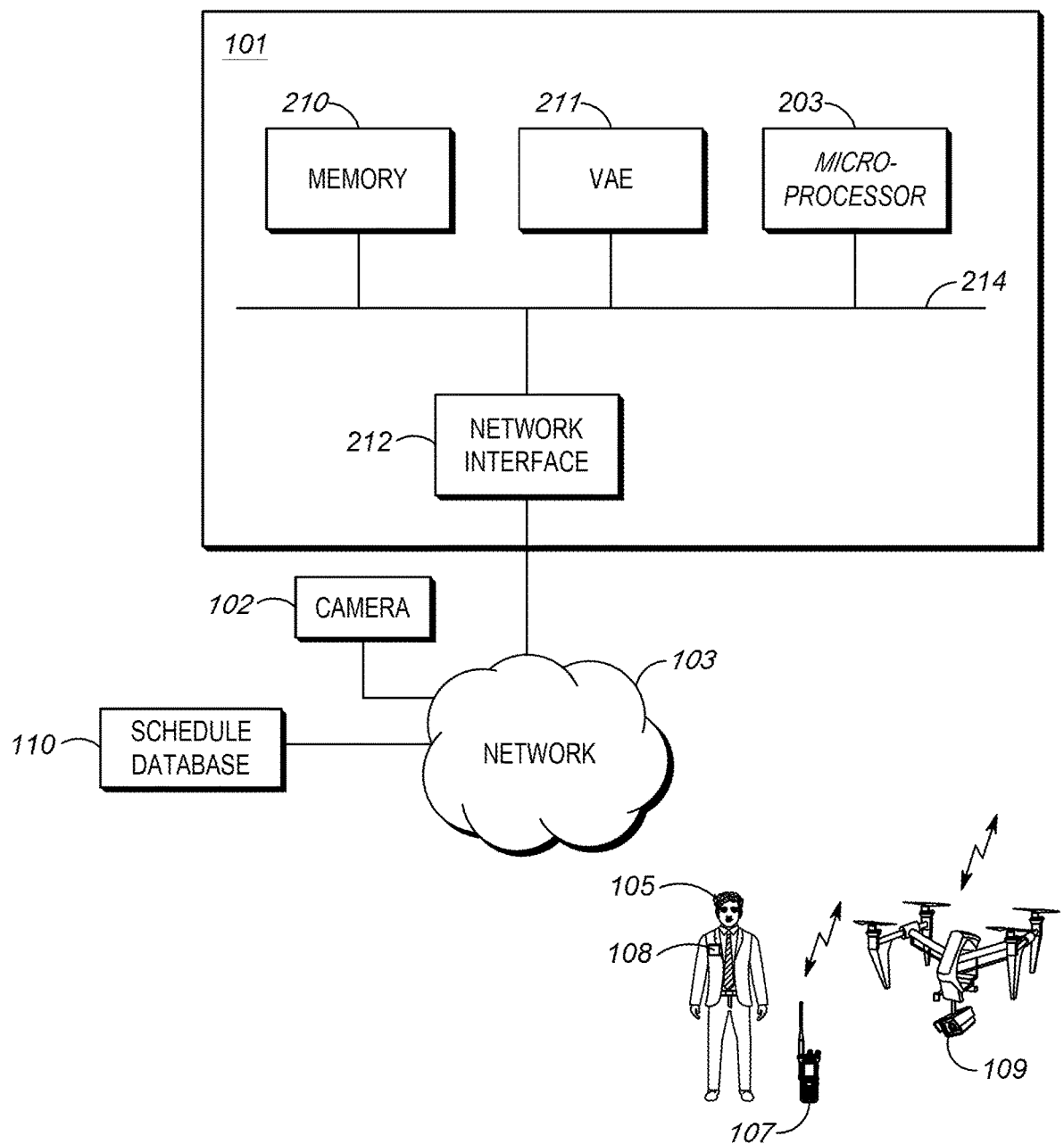
FIG. 2 illustrates the operational environment of FIG. 1 having a more-detailed a block diagram of an update server of FIG. 1.

FIG. 2 illustrates operational environment 100 with a more-detailed block diagram of server 101 in accordance with some embodiments. As discussed above, in an alternate embodiment, the components shown within server 101 may be located within camera 102 to provide camera 102 the ability to schedule updates as discussed herein.

Server 101 may include various components connected by a bus 214. Server 101 may include a hardware processor (logic circuitry) 203 such as one or more central processing units (CPUs) or other processing circuitry able to provide any of the functionality described herein when running instructions. Processor 203 may be connected to memory 210 that may include a non-transitory machine-readable medium on which is stored one or more sets of instructions. Memory 210 may include one or more of static or dynamic storage, or removable or non-removable storage, for example. A machine-readable medium may include any medium that is capable of storing, encoding, or carrying instructions for execution by processor 203, such as solid-state memories, magnetic media, and optical media. Machine-readable medium may include, for example, Electrically Programmable Read-Only Memory (EPROM), Random Access Memory (RAM), or flash memory.

The instructions stored in memory 210 enable server 101 to operate in any manner thus programmed, such as the functionality described specifically herein, when processor 203 executes the instructions. The machine-readable medium may be stored as a single medium or in multiple media, in a centralized or distributed manner. In some embodiments, instructions may further be transmitted or received over a communications network via a network interface 212 utilizing any one of a number of transfer protocols (e.g., frame relay, internet protocol (IP), transmission control protocol (TCP), user datagram protocol (UDP), hypertext transfer protocol (HTTP), etc.).

Network interface 212 may thus enable server 101 to communicate data and send/receive control information with other devices (e.g., camera 102, database 110, body-worn camera 108, device 107, and drone 109) through network 103 via wired or wireless communication. Network interface 212 may include electronic components such as a transceiver that enables serial or parallel communication. The wireless connections may use one or more protocols, including Institute of Electrical and Electronics Engineers (IEEE) Wi-Fi 802.11, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHZ range, 1.8-1.9 GHz range, 2.3-2.4 GHz range, 60 GHz range, and others, including infrared (IR) communications. Example communication networks to which server 101 may be connected via network interface 212 may include a local area network (LAN), a wide area network (WAN), a packet data network (e.g., the Internet), mobile telephone networks (e.g., cellular networks), and wireless data networks. Although not specifically shown, multiple interfaces 212 may be provided to enable multiple forms of communication.

All cameras includes circuitry to image their geographic surroundings within the camera's FOV. The cameras electronically captures a sequence of video frames (i.e., a sequence of one or more still images) of a FOV, with optional accompanying audio, in a digital format at a particular frame rate. The images or video captured by the image/video cameras may be stored in the storage component 210, or within internal memory (not shown) of the camera.\

Server 101 may also comprise circuitry configured to serve as a video analysis engine (VAE) 211 which comprises a software engine that analyzes analog and/or digital video. Alternatively, this software engine may simply be stored in memory 210. The engine is configured to "watch" video and detect pre-selected objects such as people, faces, cameras, drones, . . . , or any other security asset. The software engine may also be configured to detect certain actions of individuals, such as loitering, walking, . . . , etc. The VAE may contain any of several object/action detectors. Each object/action detector "watches" the video (which may include a live feed) for a particular type of object or action. Object and action detectors can be mixed and matched depending upon what is trying to be detected. Using VAE 211 and a video feed from camera 102, logic circuitry 203 is capable of detecting when a security asset is within a particular distance from stationary camera 102.

In addition to physically detecting when a security asset is within a particular distance from stationary camera 102 via the video feed from camera 102, in an alternate embodiment of the present invention, network interface 212 may continuously receiving periodic location updates from security assets (e.g., camera 108, device 107, drone 109, and/or any other security asset). These location updates are stored in memory 210.

A user of server 101 may instruct logic circuitry 203 to push updates to various cameras 102. This may be accomplished via a graphical-user interface (GUI) (not shown in FIG. 2). The user may also provide the update to be pushed to the cameras to memory 210 to be stored. Server 101 can then push the updates to the various cameras 102 when a security asset is within a particular distance from the camera (or alternatively detected from the video feed from the camera).

With the above in mind, server 101 comprises a network interface configured to receive a location of a security asset, a processor, and code stored in memory for instructing the processor to determine that a stationary camera needs a software or firmware update, determine a location of the security asset, determine if the security asset is within a predetermined distance from the stationary camera, and perform the software update on the stationary camera based on the security asset being within the predetermined distance from the stationary camera.

As discussed above, the processor may perform the software update on the stationary camera by pushing the software update to the stationary camera via the network interface. Additionally, the security asset may comprise a mobile camera or a security guard.

As discussed above the code may instruct the processor to determine the location of the security asset by receiving a location from the security asset or by receiving a schedule for the security asset and determine the location of the security asset from the schedule. Additionally, a VAE may be used to detect the security asset from camera 102.

As discussed above, the code may additionally instruct the processor to determine from the schedule, a time that the security asset is within the predetermined distance from the camera, and perform the software update on the camera (i.e., push the software to the camera) at the time.

Additionally, the code may instruct the processor to determine from the schedule that the security asset is not scheduled to be within the predetermined distance to the camera, and message the security asset to instruct them to move within the predetermined distance to the camera. The message may comprise a text message, email message, or any other type of message.

Figure 3:
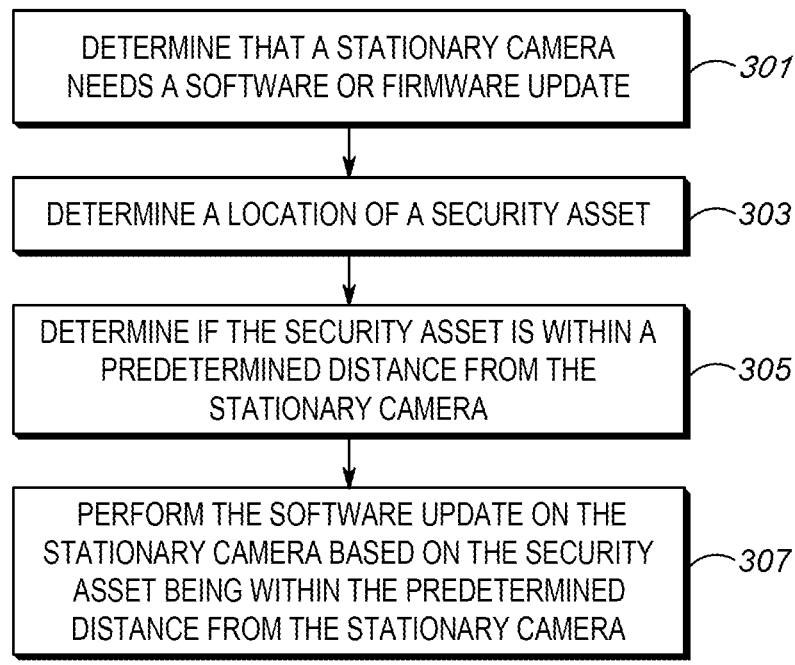
FIG. 3 is a flow chart showing operation of the update server of FIG. 1.

FIG. 3 is a flow chart showing operation of the server shown in FIG. 2. The logic flow begins at step 301 where logic circuitry 203 determines that a stationary camera needs a software or firmware update. At step 303, logic circuitry determines a location of a security asset, and determines if the security asset is within a predetermined distance from the stationary camera (step 305). Finally at step 307 logic circuitry 203 performs the software update on the stationary camera based on the security asset being within the predetermined distance from the stationary camera.

As discussed above the step of performing the software update may comprise the step of pushing the software update to the stationary camera. The security asset may comprise a mobile camera or a security guard. The step of determining the location of the security asset may comprise the step of receiving the location directly from the security asset, determining the location of the security asset from the schedule, or using a VAE to detect the security asset.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot electronically push an update to a camera, or update the camera, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a network interface configured to receive a location of a security asset;
   a processor; and
   code operating on the processor that instructs the processor to:
      determine that a stationary camera needs a software or firmware update;
      determine a location of the security asset;
      determine if the security asset is within a predetermined distance from the stationary camera; and
      perform the software update on the stationary camera based on the security asset being within the predetermined distance from the stationary camera.

2. The apparatus of claim 1 wherein the processor performs the software update on the stationary camera by pushing the software update to the stationary camera via the network interface.

3. The apparatus of claim 1 wherein the security asset comprises a mobile camera.

4. The apparatus of claim 1 wherein the security asset comprises a security guard.

5. The apparatus of claim 1 wherein the code instructs the processor to determine the location of the security asset by receiving a location from the security asset.

6. The apparatus of claim 1 wherein the code instructs the processor to determine the location of the security asset by receiving a schedule for the security asset and determine the location of the security asset from the schedule.

7. The apparatus of claim 6 wherein the code instructs the processor to:
   determine from the schedule, a time that the security asset is within the predetermined distance from the camera; and
   perform the software update on the camera at the time.

8. The apparatus of claim 6 wherein the code instructs the processor to:
   determine from the schedule that the security asset is not scheduled to be within the predetermined distance to the camera; and
   message the security asset to instruct them to move within the predetermined distance to the camera.

9. An apparatus comprising:
   a network interface configured to receive a location of a security asset;
   a processor; and
   code operating on the processor that instructs the processor to:
      determine that a stationary camera needs a software or firmware update;
      determine a location of the security asset;
      determine if the security asset is within a predetermined distance from the stationary camera; and
      perform the software update on the stationary camera based on the security asset being within the predetermined distance from the stationary camera;
   wherein the processor performs the software update on the stationary camera by pushing the software update to the stationary camera via the network interface;
   wherein the security asset comprises a mobile camera;
   wherein the code also instructs the processor to determine the location of the security asset by receiving a location from the security asset.

10. A method comprising the steps of:
    determining that a stationary camera needs a software or firmware update;
    determining a location of a security asset;
    determining if the security asset is within a predetermined distance from the stationary camera; and
    performing the software update on the stationary camera based on the security asset being within the predetermined distance from the stationary camera.

11. The method of claim 10 wherein the step of performing the software update comprises the step of pushing the software update to the stationary camera.

12. The method of claim 10 wherein the security asset comprises a mobile camera.

13. The method of claim 10 wherein the security asset comprises a security guard.

14. The method of claim 10 wherein the step of determining the location of the security asset comprises the step of receiving the location directly from the security asset.

15. The method of claim 10 wherein the step of determining the location of the security asset comprises a step of receiving a schedule for the security asset and determine the location of the security asset from the schedule.

* * * * *